(12) United States Patent
Hur (10) Patent No.: US 11,098,779 B2
(45) Date of Patent: Aug. 24, 2021

(54) ACTUATOR AND ELECTROMECHANICAL DISC BRAKE HAVING THE SAME

(71) Applicant: MANDO CORPORATION, Gyeonggi-do (KR)

(72) Inventor: Jae Jin Hur, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 93 days.

(21) Appl. No.: 16/417,392

(22) Filed: May 20, 2019

(65) Prior Publication Data
US 2020/0240484 A1   Jul. 30, 2020

(30) Foreign Application Priority Data
Jan. 30, 2019   (KR) ................. 10-2019-0011784

(51) Int. Cl.
*F16D 55/22* (2006.01)
*F16D 65/18* (2006.01)
(Continued)

(52) U.S. Cl.
CPC ............ *F16D 65/183* (2013.01); *B60T 1/065* (2013.01); *F16D 11/16* (2013.01); *F16D 13/10* (2013.01); *F16D 55/226* (2013.01); *F16D 67/02* (2013.01); *F16H 57/10* (2013.01); *F16D 2055/0029* (2013.01); *F16D 2121/14* (2013.01); *F16D 2121/24* (2013.01); *F16D 2125/40* (2013.01); *F16D 2125/50* (2013.01); *F16D 2127/02* (2013.01)

(58) Field of Classification Search
CPC ......... F16D 2125/50; F16D 2055/0029; F16D 67/00; F16D 67/02; F16D 2125/36; F16D 2125/38; F16D 2121/14; F16D 2121/24; F16D 2125/40; F16H 57/10
See application file for complete search history.

(56) References Cited

U.S. PATENT DOCUMENTS 5,775,539 A * 7/1998 Bates .................. B05C 17/0103
222/1
6,138,801 A * 10/2000 Shirai ..................... B60T 13/74
188/157
(Continued)

FOREIGN PATENT DOCUMENTS

JP   2005-147170   6/2005
JP   2011-236984   11/2011
(Continued)

*Primary Examiner* — Nicholas J Lane
(74) *Attorney, Agent, or Firm* — Ladas & Parry, LLP (57) ABSTRACT

Disclosed is an electromechanical disc brake. The electromechanical disc brake includes a piston slidably disposed in a cylinder of a caliper housing to press a pad plate, an actuator including a motor and a speed reduction device for reducing a rotation speed of the motor, an output conversion device for converting a rotational motion from the speed reduction device into a linear motion and imparting a thrust to move the piston, an elastic member for moving the output conversion device to the original position when releasing braking, and a clutch device for releasing a torque acting on the speed reduction device such that the output conversion device is moved to the original position by the elastic member when releasing the braking.

22 Claims, 10 Drawing Sheets

(51) Int. Cl.

| | |
|---|---|
| *F16D 55/226* | (2006.01) |
| *F16H 57/10* | (2006.01) |
| *F16D 11/16* | (2006.01) |
| *F16D 13/10* | (2006.01) |
| *B60T 1/06* | (2006.01) |
| *F16D 67/02* | (2006.01) |
| *F16D 127/02* | (2012.01) |
| *F16D 125/40* | (2012.01) |
| *F16D 125/50* | (2012.01) |
| *F16D 121/24* | (2012.01) |
| *F16D 121/14* | (2012.01) |
| *F16D 55/00* | (2006.01) |

(56) References Cited

U.S. PATENT DOCUMENTS

| | | | | |
|---|---|---|---|---|
| 6,536,561 | B1* | 3/2003 | Keller | B60T 1/062 |
| | | | | 188/162 |
| 8,348,023 | B2* | 1/2013 | Sakashita | F16D 65/18 |
| | | | | 188/72.1 |
| 8,448,825 | B2* | 5/2013 | Mitrovic | B05C 17/0103 |
| | | | | 222/333 |
| 10,024,375 | B2* | 7/2018 | Son | B60T 13/588 |
| 2004/0097318 | A1* | 5/2004 | Greuel | H02K 7/108 |
| | | | | 475/149 |
| 2005/0277512 | A1* | 12/2005 | Gueler | E05F 15/603 |
| | | | | 475/317 |
| 2010/0243387 | A1* | 9/2010 | Vollert | F16D 65/56 |
| | | | | 188/156 |
| 2011/0315492 | A1* | 12/2011 | Sakashita | F16D 65/18 |
| | | | | 188/72.1 |
| 2014/0000993 | A1* | 1/2014 | No | F16D 55/226 |
| | | | | 188/72.8 |
| 2014/0034430 | A1* | 2/2014 | Fuse | F16D 65/18 |
| | | | | 188/72.4 |
| 2015/0094186 | A1* | 4/2015 | Bang | F16H 57/10 |
| | | | | 475/280 |
| 2016/0223040 | A1* | 8/2016 | Watzek | F16D 65/18 |
| 2016/0333951 | A1* | 11/2016 | Lee | F16D 55/227 |
| 2016/0377138 | A1* | 12/2016 | Loens | F16D 55/226 |
| | | | | 188/106 F |
| 2018/0238408 | A1* | 8/2018 | Song | F16D 65/18 |

FOREIGN PATENT DOCUMENTS

| | | |
|---|---|---|
| JP | 5093476 | 12/2012 |
| JP | 6182245 | 8/2017 |
| JP | 2018-062989 | 4/2018 |

* cited by examiner

ACTUATOR AND ELECTROMECHANICAL DISC BRAKE HAVING THE SAME

CROSS-REFERENCE TO RELATED APPLICATION(S)

This application is based on and claims priority under 35 U.S.C. § 119 to Korean Patent Application No. 10-2019-0011784, filed on Jan. 30, 2019, in the Korean Intellectual Property Office, the disclosure of which is incorporated by reference herein in its entirety.

BACKGROUND

1. Technical Field

The disclosure relates to an electromechanical disc brake, and more particularly to an electromechanical disc brake that implements braking in an electrical manner.

2. Description of the Related Art

Generally, an electromechanical brake is an apparatus that detects a driver's braking intention and then controls the braking pressure of front and rear wheels by using a motor.

The electromechanical brake may perform all the intelligent brakes to the future automatic braking functions required by the intelligent cruise control system from general braking, anti-lock brake system (ABS), electronic stability control (ESC) and vehicle dynamic control (VDC).

The electromechanical brake creates an appropriate clamping pressure on a caliper using a motor and a speed reduction device, and performs the function of a service brake through the clamping pressure.

Because the electromechanical brake has a structure that is operated by forward rotation and reverse rotation of the motor and the speed reduction device when braking or releasing the brake, when the forward rotation and the reverse rotation are repeated, the operating speed is slowed by the rotational inertia, and a high load is generated in the motor and the speed reduction device, thereby causing a problem that the braking performance is deteriorated.

SUMMARY

It is an aspect of the disclosure to provide an electromechanical disc brake capable of improving the operating speed upon braking release.

Additional aspects of the disclosure will be set forth in part in the description which follows and, in part, will be obvious from the description, or may be learned by practice of the disclosure.

In accordance with an aspect of the disclosure, an electromechanical disc brake includes a piston slidably disposed in a cylinder of a caliper housing to press a pad plate, an actuator including a motor and a speed reduction device for reducing a rotation speed of the motor, an output conversion device for converting a rotational motion from the speed reduction device into a linear motion and imparting a thrust to move the piston, an elastic member for moving the output conversion device to the original position when releasing braking, and a clutch device for releasing a torque acting on the speed reduction device such that the output conversion device is moved to the original position by the elastic member when releasing the braking.

The output conversion device may include a ball-in ramp mechanism and a push member for pressing the piston by the operation of the ball-in ramp mechanism.

The speed reduction device may include a planetary gear assembly having a sun gear, a ring gear, planetary gears, and a carrier.

The clutch device may restrain the ring gear when braking and release the restraint of the ring gear when releasing the braking so that the ring gear is rotatable.

The clutch device may include a torsion spring for tightening or loosening an outer circumference of the ring gear.

One end of the torsion spring may be fixed to one side of a housing of the actuator, and the other end of the torsion spring may be connected to a spring operation device for operating the torsion spring to tighten or loosen the torsion spring.

The spring operation device may include a solenoid drive device for pressing the other end of the torsion spring in a direction in which a body of the torsion spring is loosened.

The clutch device may include a pad member provided to selectively contact an outer circumference of the ring gear.

The clutch device may include a latching rod provided to be selectively caught between latching protrusions formed on an outer circumference of the ring gear.

The motor may be a one-way rotating motor that is driven only at the time of braking.

In accordance with another aspect of the disclosure, an actuator of an electromechanical disc brake includes a motor and a speed reduction device for reducing a rotation speed of the motor, wherein the speed reduction device includes a planetary gear assembly having a sun gear, a ring gear, planetary gears and a carrier to rotate by power of the motor, and a clutch device for selectively restraining the ring gear, and the clutch device restrains rotation of the ring gear when braking and releases the restraint of the ring gear when releasing the braking so that the ring gear is in an idle state.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the disclosure will be described in detail with reference to the accompanying drawings. The embodiments described below are provided by way of example so that those skilled in the art will be able to fully understand the spirit of the disclosure. The disclosure is not limited to the embodiments described below, but may be embodied in other forms. In order to clearly explain the disclosure, parts not related to the description are omitted from the drawings, and the width, length, thickness, etc. of the components may be exaggerated for convenience. Like reference numerals refer to like elements throughout this specification.

Figure 1:
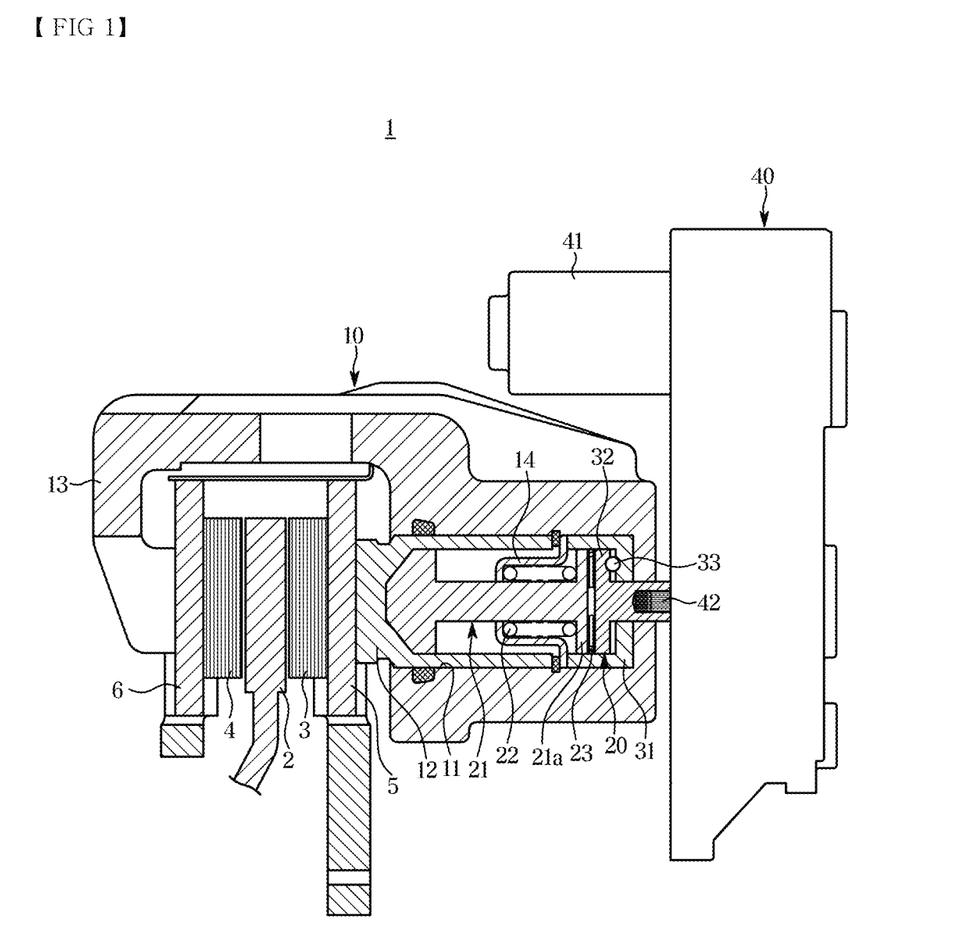
FIG. 1 is a schematic view of an electromechanical disc brake according to an embodiment of the disclosure.
Figure 2:
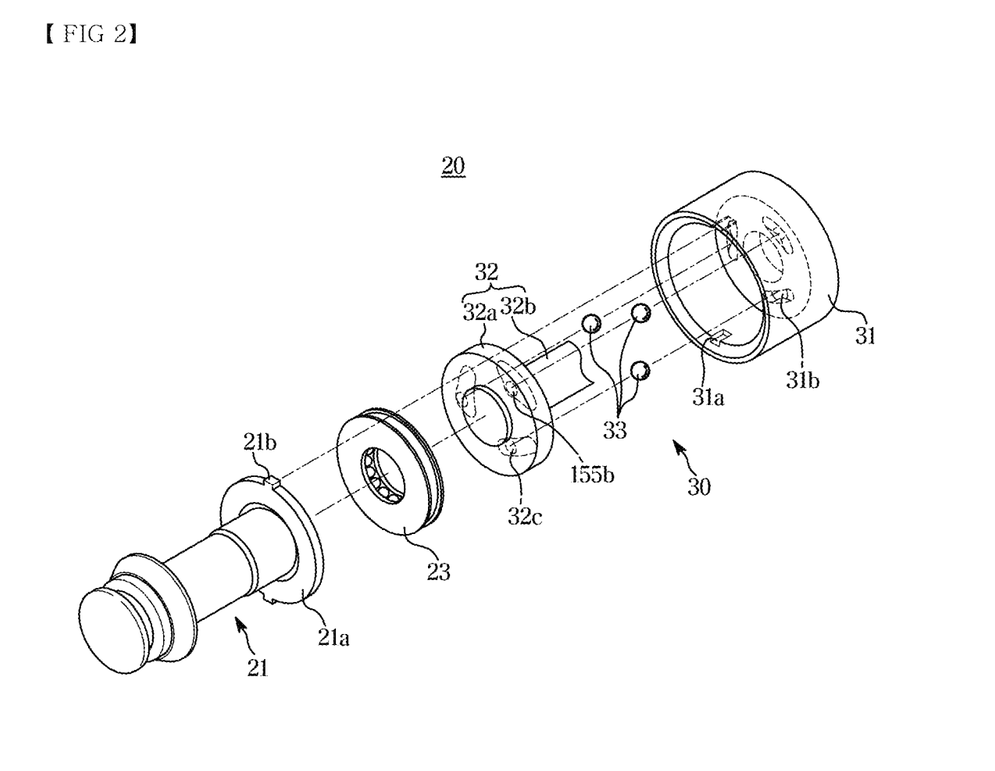
FIG. 2 is a perspective view of a ball-in ramp mechanism according to an embodiment of the disclosure.

FIG. 1 is a schematic view of an electromechanical disc brake according to an embodiment of the disclosure, and FIG. 2 is a perspective view of a ball-in ramp mechanism according to an embodiment of the disclosure.

Referring to FIGS. 1 and 2, an electromechanical disc brake 1 according to an embodiment of the disclosure includes a disk 2 rotating together with a wheel, a carrier in which a pair of pad plates 5 and 6 to which friction pads 3 and 4 each are attached are installed in a state of being spaced apart from a certain distance, a caliper housing 10 slidably mounted on the carrier to operate the pad plates 5 and 6, a piston 12 installed in a cylinder 11 of the caliper housing 10 to be movable forward and backward, an output conversion device 20 which applies a thrust for moving the piston 12 by receiving a rotational force from an actuator 40 including a motor 41 and a speed reduction device 50 and converting the rotational force into a linear motion, an elastic member 22 for returning the output conversion device 20 to the original position when the brake is released, and a clutch device 60 for releasing a torque acting on the speed reduction device 50 so that the output conversion device 20 is moved to the original position by the elastic member 22 when the brake is released.

The caliper housing 10 includes the cylinder 11 in which the piston 12 is housed, and a finger 13 for operating the pad plates 5 and 6.

The friction pads 3 and 4 are attached to the inside of the pad plates 5 and 6, respectively, and the pad plate 5 on one side is disposed to be in contact with the piston 12 and the pad plate 6 on the other side is disposed in contact with the finger 13.

The output conversion device 20 is provided to receive power from the actuator 40 and convert a rotational motion into a linear motion to press the piston 12 toward the pad plate 5.

As an example, the output conversion device 20 may include a ball-in ramp mechanism 30 and a push member 21 which presses the piston 12 by the operation of the ball-in ramp mechanism 30.

The ball-in ramp mechanism 30 includes a fixed ramp 31 fixedly mounted on the cylinder 11, a rotary ramp 32 positioned in the front of the fixed ramp 31 so that it is rotated by receiving power from the actuator 40, and balls 33 interposed between the fixed ramp 31 and the rotary ramp 32.

The rotary ramp 32 includes a disc portion 32a formed in a disc shape and a shaft portion 32b formed to extend from the center of the disk portion 32a toward the fixed ramp 31, so that an axial cross section of the rotary ramp 32 is formed in a T shape.

The shaft portion 32b of the rotary ramp 32 which is a portion rotated by receiving the power from the actuator 40 is connected to an output shaft 42 of the actuator 40 through a rear end portion of the shaft portion 32b passing through the fixed ramp 31 and the cylinder 11.

The fixed ramp 31 has a cylindrical shape in which a front portion is opened, and is fixedly installed in the cylinder 11. A flange 21a of the push member 21 and a thrust bearing 23 are disposed in the fixed ramp 31.

A protrusion 21b protruding from an outer circumference of the flange 21a of the push member 21 is fitted in a fitting groove 31a formed in an inner circumference of the fixed ramp 31 so that the push member 21 is slidably coupled to the fixed ramp 31 in a state in which rotation is restricted. The thrust bearing 23 is interposed between the flange 21a of the push member 21 and the disc portion 32a of the rotary ramp 32.

The balls 33 are interposed between the fixed ramp 31 and the rotary ramp 32. Guide grooves 31b and 32c in which the balls 33 are movably seated are formed on the mutually opposite surfaces of the fixed ramp 31 and the rotary ramp 32, respectively.

The guide grooves 31b and 32c are each formed to extend in an arc-like shape with a predetermined inclination angle along a circumferential direction. Accordingly, when the rotary ramp 32 rotates, the balls 33 roll along the inclined guide grooves 31b and 32c, and when the balls 33 roll, the rotary ramp 32 advances toward the piston 12 along the axial direction while rotating.

The push member 21 is elastically supported by the elastic member 22 provided in the cylinder 11 in a direction in which the rotary ramp 32 presses toward the fixed ramp 31 side.

The elastic member 22 includes a coil spring whose one end is elastically supported by a retainer 14 fixed to the inner wall of the cylinder 11 and the other end is elastically supported by the flange 21a of the push member 21.

The elastic member 22 brings the fixed ramp 31 and the rotary ramp 32 into close contact with each other by providing an elastic force in the direction in which the flange 21a of the push member 21 presses the thrust bearing 23, and returns the push member 21 by rotating the rotary ramp 32 to the original position in a state where a rotational torque applied to the rotary ramp 32 is removed.

Although the present embodiment exemplifies the configuration of a ball-in ramp mechanism having the balls 33 interposed between the fixed ramp 31 and the rotary ramp 32 as an example of the output conversion device 20, various known configurations may be employed as long as it is possible to convert the rotational motion of the actuator 40 into a linear motion.

Figure 3:
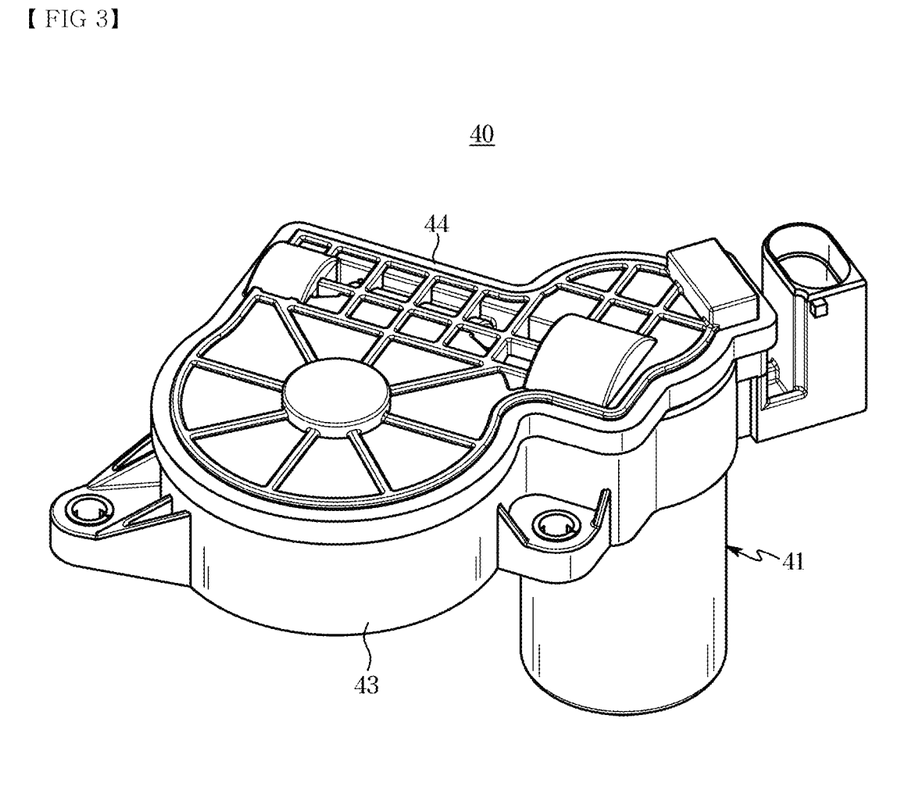
FIG. 3 is a perspective view of an outer appearance of an actuator according to an embodiment of the disclosure.
Figure 4:
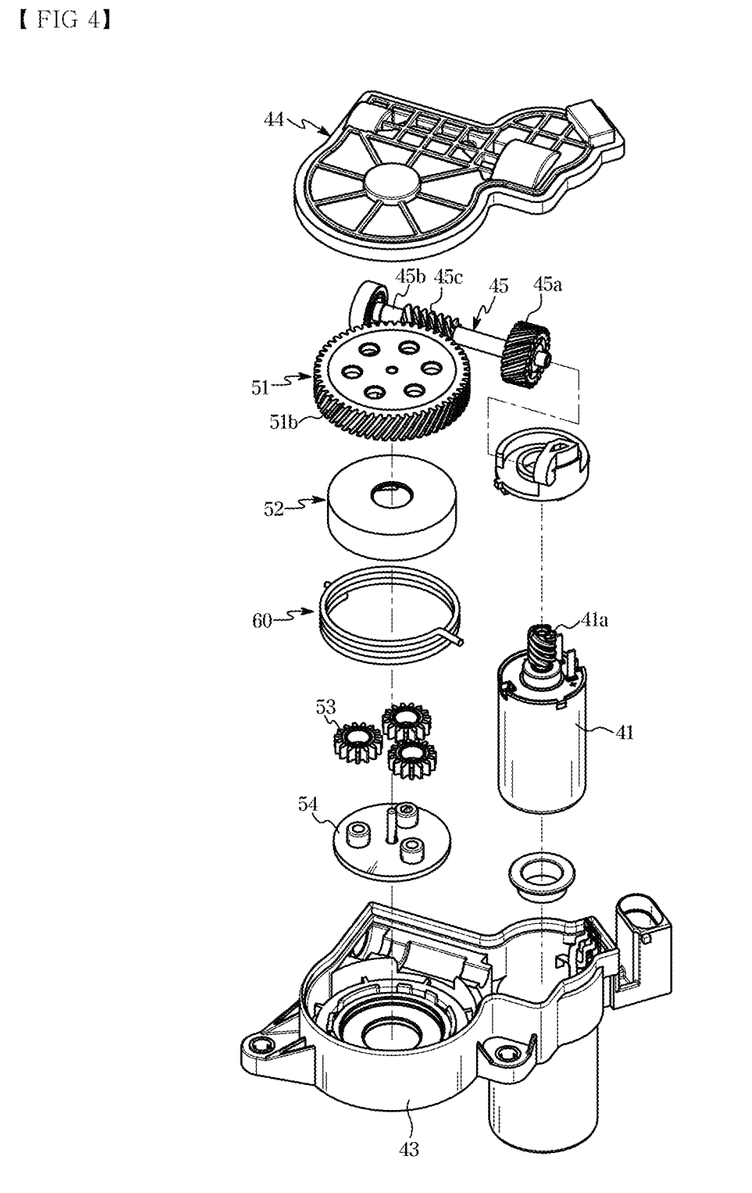
FIG. 4 is an exploded perspective view of the actuator according to an embodiment of the disclosure.
Figure 5:
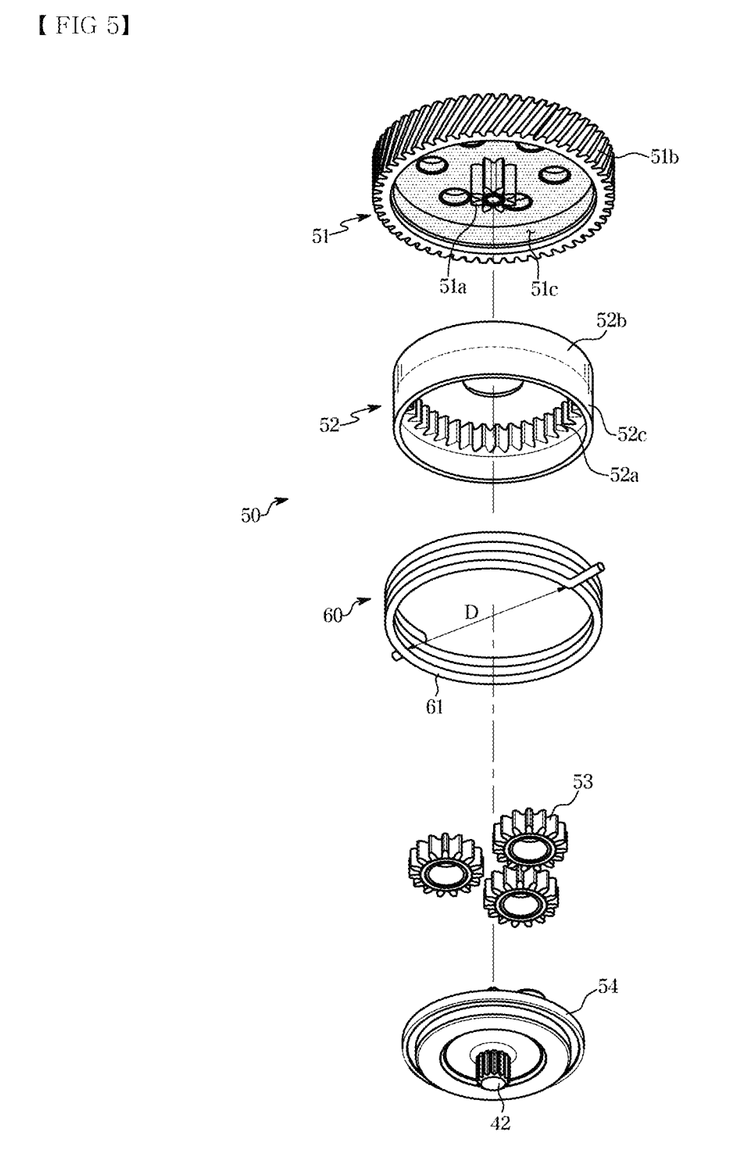
FIG. 5 is an exploded perspective view of a speed reduction device according to an embodiment of the disclosure.
Figure 6:
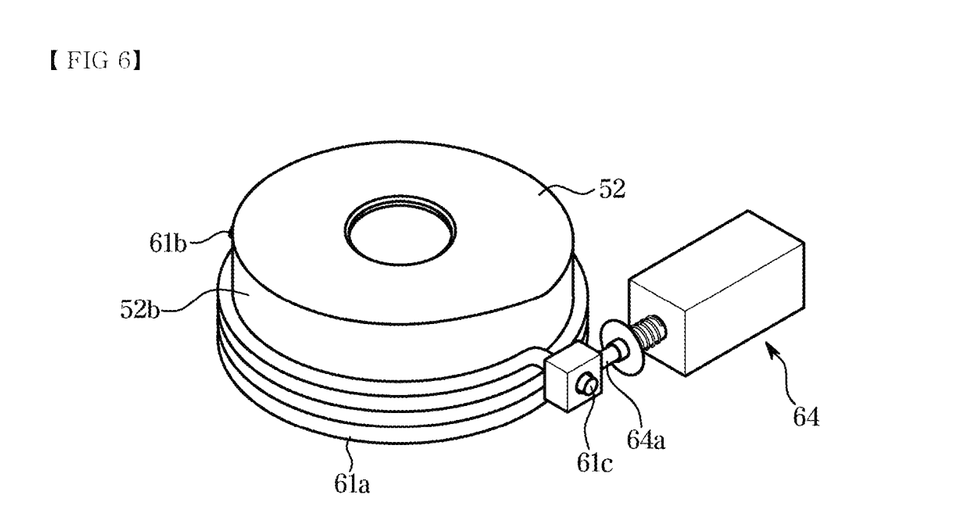
FIG. 6 is a perspective view of a clutch device according to an embodiment of the disclosure.

FIG. 3 is a perspective view of an outer appearance of an actuator according to an embodiment of the disclosure, FIG. 4 is an exploded perspective view of the actuator according to an embodiment of the disclosure, FIG. 5 is an exploded perspective view of a speed reduction device according to an embodiment of the disclosure, and FIG. 6 is a perspective view of a clutch device according to an embodiment of the disclosure.

Referring to FIGS. 3 to 6, the actuator 40 includes the motor 41, and the speed reduction device 50 for increasing a force by reducing the rotation speed of the motor 41.

The actuator 40 further includes a housing 43 in which the motor 41 and the speed reduction device 50 are housed and a cover 44 for covering an open surface of the housing 43, and the speed reduction device 50 includes a planetary gear assembly. The motor 41 may be constituted by a one-way motor driven only at the time of braking.

The power transmission from the motor 41 to the speed reduction device 50 is achieved by a worm member 45. A driving worm 41a is coupled to a rotating shaft of the motor 41. The driving worm 41a transmits the rotational force of the motor 41 to the worm member 45 by engaging with a driven worm wheel 45a of the worm member 45.

The rotational force of the worm member 45 is transmitted to the planetary gear assembly and then outputted with an increased force through the output shaft 42 of the planetary gear assembly.

The planetary gear assembly includes a worm wheel 51 engaged with the worm member 45, a ring gear 52 rotatably installed inside the worm wheel 51, a sun gear 51a rotating together with the worm wheel 51, a plurality of planetary gears 53 arranged to be engaged with the sun gear 51a and gear teeth 52a provided on an inner circumference of the ring gear 52, and a carrier 54 on which the plurality of planetary gears 53 are rotatably supported.

The worm wheel 51 has a hollow cylindrical shape whose one surface is opened, helical gear teeth 51b engaged with helical gear teeth 45c provided on a shaft 45b of the worm member 45 are provided on an outer circumference of the worm wheel 51, and the sun gear 51a is fixedly installed at a central portion of an inner accommodating space 51c of the worm wheel 51.

The plurality of planetary gears 53 are rotatably installed at shaft portions formed on the carrier 54. As an example, three of the planetary gears 53 are arranged at regular intervals along the circumferential direction of the sun gear 51a.

The carrier 54 is formed in the form of a disc, and the output shaft 42 is provided on the surface opposite to the surface on which the planetary gears 53 are mounted. The output shaft 42 is connected to the shaft portion 32b of the rotary ramp 32 constituting the ball-in ramp mechanism 30, which is described above, and thus transmits the output of the speed reduction device 50 to the output conversion device 20.

The ring gear 52 has a hollow cylindrical shape whose one surface is opened and is rotatably supported in the inner accommodating space 51c of the worm wheel 51, and may be rotated or fixed in the inner accommodating space 51c of the worm wheel 51 as the ring gear 52 is selectively constrained or released by the clutch device 60.

The ring gear 52 includes a rotating surface 52b accommodated in the accommodating space 51c of the worm wheel 51 and rotatably supported on an inner circumference of the worm wheel 51, and a clutch surface 52c exposed to the outside of the accommodating space 51c of the worm wheel 51 and coupled with the clutch device 60.

The clutch device 60 includes a torsion spring 61 wound around on outer circumference of the clutch surface 52c of the ring gear 52 to tighten or loosen the outer circumference of the clutch surface 52c, and a spring operation device 64 for operating the torsion spring 61.

A body 61a of the torsion spring 61 surrounds and tightens the outer circumference of the clutch surface 52c of the ring gear 52. One end 61b of the body 61a may be fixedly installed on one side of the housing 43 and the other end 61c of the body 61a may be connected to the spring operation device 64.

In normal operation (during braking), the body 61a of the torsion spring 61 tightens the clutch surface 52c of the ring gear 52 to restrain the ring gear 52 from rotating. During releasing the braking, the body 61a of the torsion spring 61 releases the tightening of the clutch surface 52c of the ring gear 52 to release the restraint of the ring gear 52 as a diameter D of the body 61a of the torsion spring 61 is expanded by the operation of the spring operation device 64.

The spring operation device 64 may be constituted by a solenoid drive device having a plunger 64a moving forward and backward. The solenoid drive device may be actuated to advance the plunger 64a by a magnetic field generated when power is applied to an electric coil and may be actuated to restore the plunger 64a to its initial position by the elastic force of a restoring spring when power is not applied.

As one end of the plunger 64a is connected to the other end 61c of the torsion spring 61 and the plunger 64a advances when braking is released to press the other end 61c of the torsion spring 61 toward the direction in which the body 61a of the torsion spring 61 is loosened, the spring operation device 64 expands the diameter D of the body 61a of the torsion spring 61.

Figure 7:
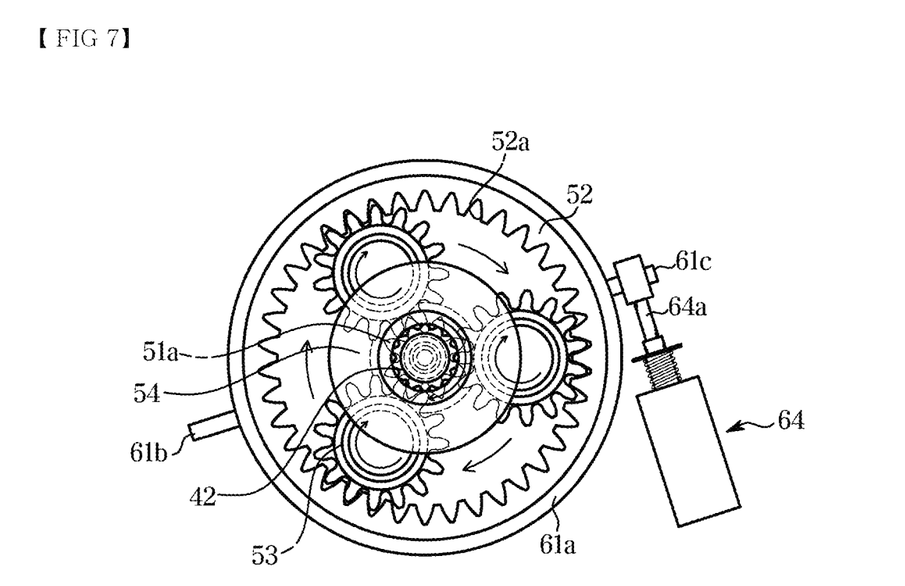
FIG. 7 is an operational state view of the speed reduction device and the clutch device during braking according to the embodiment of the disclosure.
Figure 8:
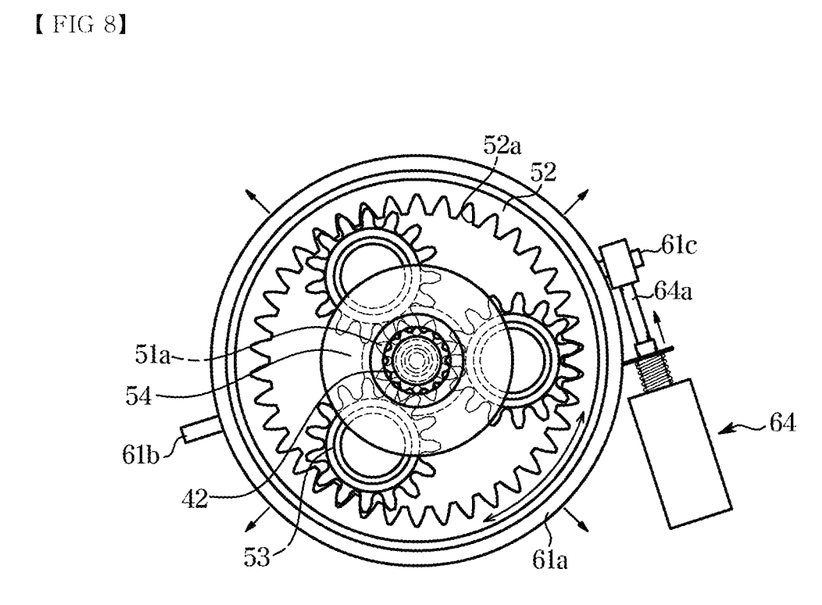
FIG. 8 is an operational state view of the speed reduction device and the clutch device during release the braking according to the embodiment of the disclosure.

FIG. 7 is an operational state view of the speed reduction device and the clutch device during braking according to the embodiment of the disclosure, and FIG. 8 is an operational state view of the speed reduction device and the clutch device during release the braking according to the embodiment of the disclosure.

With this configuration, when the motor 41 is driven during braking, the power of the motor 41 is transmitted to the worm wheel 51 through the driving worm 41a, the driven worm wheel 45a, and the helical gear teeth 45c of the worm member 45, and the rotational force of the worm wheel 51 is transmitted to the plurality of planetary gears 53 through the sun gear 51a. In this case, because the ring gear 52 is in a fixed state by the body 61a of the torsion spring 61 of the clutch device 60 as illustrated in FIG. 7, the plurality of planetary gears 53 revolve around the sun gear 51a along the gear teeth 52a of the ring gear 52. The carrier 54 is rotated by the plurality of planetary gears 53 revolving in this manner and the rotary ramp 32 of the output conversion device 20 is rotated through the output shaft 42 of the carrier 54.

When the rotary ramp 32 of the output conversion device 20 is rotated, the balls 33 roll between the inclined guide grooves 31b and 32c and the rotary ramp 32 advances the push member 21 in the axial direction while rotating to press the piston 12, thereby performing the braking.

When the braking is released, as illustrated in FIG. 8, the clutch device 60 operates the spring operation device 64 to advance the plunger 64a, thereby expanding the diameter of the body 61a of the torsion spring 61. Accordingly, the locking of the ring gear 52 is released and the ring gear 52 is in an idle state in which it may rotate, and thus the plurality of planetary gears 53 engaged with the gear teeth 52a of the ring gear 52 are also in an idle state in which the rotational torque is released. Therefore, the rotational torque transmitted to the output conversion device 20 is released, and the braking is released as the piston 12 returns to the original position by the restoring force of the elastic member 22.

In the case of the braking and releasing method according to the forward and reverse rotation of the conventional motor, the operating speed is lowered by the rotational inertia. However, in the case of the braking release method according to the present embodiment, the operating speed may be improved by releasing the braking in a clutch manner, and the number of operating rotations of the motor may also be reduced by driving the motor only at the time of braking.

Although the present embodiment exemplifies a configuration in which the clutch device 60 includes a torsion spring 61 that may tighten or loosen the clutch surface 52c of the ring gear 52, all of the constructions capable of restraining or releasing the ring gear 52 by selectively making contact with the clutch surface 52c of the ring gear 52 may be included in the present embodiment.

Figure 9:
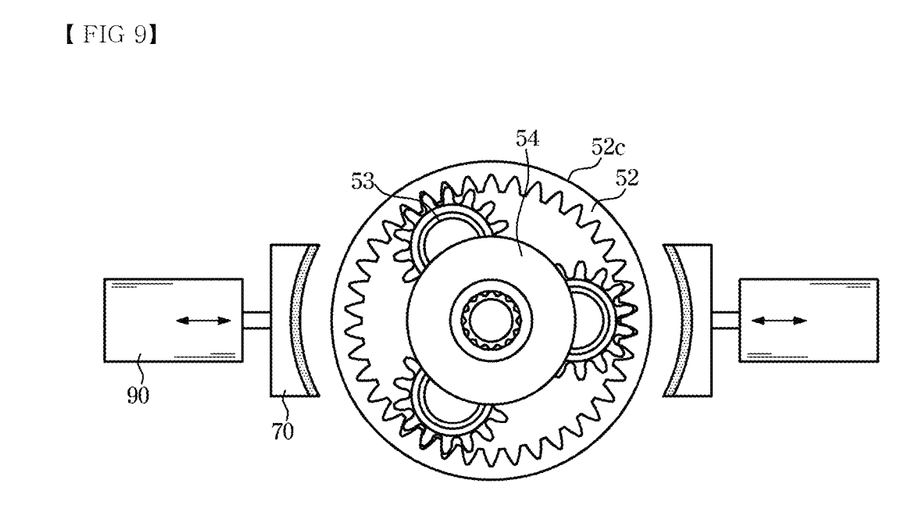
FIG. 9 is a schematic view of a clutch device according to another embodiment of the disclosure.
Figure 10:
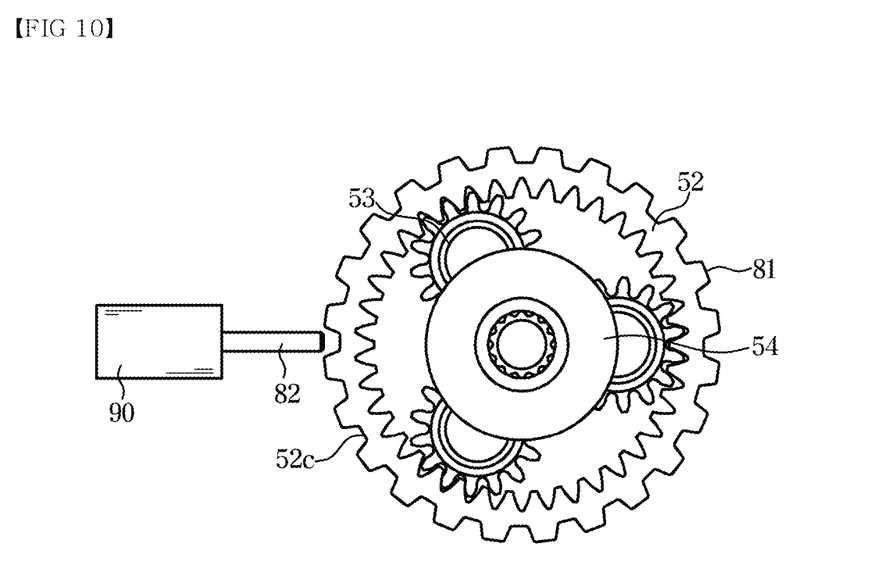
FIG. 10 is a schematic view of a clutch device according to another embodiment of the disclosure.

For example, as illustrated in FIG. 9, the clutch device 60 may be constituted by a pad member 70 for pressing the clutch surface 52c of the ring gear 52, or as illustrated in FIG. 10, the clutch device 60 may be constituted by a latching rod 82 provided to be caught between latching protrusions 81 formed on the clutch surface 52c of the ring gear 52.

The pad member 70 and the latching rod 82 may be provided such that they come into contact with and press the clutch surface 52c of the ring gear 52 during braking by a solenoid drive device 90 and are spaced apart from the clutch surface 52c of the ring gear 52 during releasing the braking by the solenoid drive device 90.

According to the embodiments of the disclosure, the operating speed for releasing the braking can be remarkably improved by releasing the braking in the clutch manner, and the lifetime can be extended due to the reduction of the number of operating rotations of the motor by driving the motor only at the time of braking.

Although a few embodiments of the disclosure have been shown and described, it would be appreciated by those skilled in the art that changes may be made in these embodiments without departing from the principles and spirit of the disclosure in the scope of which is defined in the claims and their equivalents.

What is claimed is:

1. An electromechanical disc brake comprising:
   a piston slidably disposed in a cylinder of a caliper housing to press a pad plate;
   an actuator including a motor and a speed reduction device for reducing a rotation speed of the motor;
   an output conversion device for converting a rotational motion from the speed reduction device into a linear motion and imparting a thrust to move the piston;
   an elastic member for moving the output conversion device to the original position when releasing braking; and
   a clutch device for releasing a torque acting on the speed reduction device such that the output conversion device is moved to the original position by the elastic member when releasing the braking.

2. The electromechanical disc brake according to claim 1, wherein
   the output conversion device includes a ball-in ramp mechanism and a push member for pressing the piston by the operation of the ball-in ramp mechanism.

3. The electromechanical disc brake according to claim 1, wherein
   the speed reduction device includes a planetary gear assembly having a sun gear, a ring gear, planetary gears, and a carrier.

4. The electromechanical disc brake according to claim 3, wherein
   the clutch device restrains the ring gear when braking and releases the restraint of the ring gear when releasing the braking so that the ring gear is rotatable.

5. The electromechanical disc brake according to claim 4, wherein
   the clutch device includes a torsion spring for tightening or loosening an outer circumference of the ring gear.

6. The electromechanical disc brake according to claim 5, wherein
   one end of the torsion spring is fixed to one side of a housing of the actuator, and the other end of the torsion spring is connected to a spring operation device for operating the torsion spring to tighten or loosen the torsion spring.

7. The electromechanical disc brake according to claim 6, wherein
   the spring operation device includes a solenoid drive device for pressing the other end of the torsion spring in a direction in which a body of the torsion spring is loosened.

8. The electromechanical disc brake according to claim 4, wherein
   the clutch device includes a pad member provided to selectively contact an outer circumference of the ring gear.

9. The electromechanical disc brake according to claim 4, wherein
   the clutch device includes a latching rod provided to be selectively caught between latching protrusions formed on an outer circumference of the ring gear.

10. The electromechanical disc brake according to claim 1, wherein
    the motor is a one-way rotating motor that is driven only at the time of braking.

11. An actuator of an electromechanical disc brake comprising a motor and a speed reduction device for reducing a rotation speed of the motor, wherein:
    the speed reduction device includes a planetary gear assembly having a sun gear, a ring gear, planetary gears and a carrier to rotate by power of the motor, and a clutch device for selectively restraining the ring gear; and
    the clutch device restrains rotation of the ring gear when braking and releases the restraint of the ring gear when releasing the braking so that the ring gear is in an idle state.

12. An electromechanical disc brake comprising:
    a piston slidably disposed in a cylinder of a caliper housing to press a pad plate;
    an actuator including a motor and a speed reduction device comprising a plurality of gears and configured to reduce a rotation speed of the motor;
    an output conversion device comprising a ball-in ramp mechanism configured to convert a rotational motion from the speed reduction device into a linear motion and imparting a thrust to move the piston;
    an elastic member comprising a spring and configured to move the output conversion device to the original position when releasing braking; and
    a clutch configured to release a torque acting on the speed reduction device such that the output conversion device is moved to the original position by the elastic member when releasing the braking.

13. The electromechanical disc brake according to claim 12, wherein
    the output conversion device includes a push member for pressing the piston by the operation of the ball-in ramp mechanism.

14. The electromechanical disc brake according to claim 12, wherein
    the gears of the speed reduction device include a planetary gear assembly having a sun gear, a ring gear, planetary gears, and a carrier.

15. The electromechanical disc brake according to claim 14, wherein
the clutch is configured to retrain the ring gear when braking and releases the restraint of the ring gear when releasing the braking so that the ring gear is rotatable.

16. The electromechanical disc brake according to claim 15, wherein
the clutch includes a torsion spring for tightening or loosening an outer circumference of the ring gear.

17. The electromechanical disc brake according to claim 16, wherein
one end of the torsion spring is fixed to one side of a housing of the actuator, and the other end of the torsion spring is connected to a spring operation device for operating the torsion spring to tighten or loosen the torsion spring.

18. The electromechanical disc brake according to claim 17, wherein
the spring operation device includes a solenoid drive device for pressing the other end of the torsion spring in a direction in which a body of the torsion spring is loosened.

19. The electromechanical disc brake according to claim 15, wherein
the clutch includes a pad member provided to selectively contact an outer circumference of the ring gear.

20. The electromechanical disc brake according to claim 15, wherein
the clutch includes a latching rod provided to be selectively caught between latching protrusions formed on an outer circumference of the ring gear.

21. The electromechanical disc brake according to claim 12, wherein
the motor is a one-way rotating motor that is driven only at the time of braking.

22. An actuator of an electromechanical disc brake comprising a motor and a speed reduction device for reducing a rotation speed of the motor, wherein:
the speed reduction device includes a planetary gear assembly having a sun gear, a ring gear, planetary gears and a carrier to rotate by power of the motor, and a clutch configured to selectively restrain the ring gear; and
the clutch restrains rotation of the ring gear when braking and releases the restraint of the ring gear when releasing the braking so that the ring gear is in an idle state.

* * * * *